(12) United States Patent
Greenwood

(10) Patent No.: US 6,396,547 B1
(45) Date of Patent: May 28, 2002

(54) SIGNAL GENERATOR

(75) Inventor: Jonathan Mark Greenwood, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/544,088

(22) Filed: Apr. 6, 2000

(30) Foreign Application Priority Data

Apr. 9, 1999 (GB) ............................................. 9908240

(51) Int. Cl.[7] ................................................. H04N 9/74
(52) U.S. Cl. ........................ 348/594; 348/593; 348/177
(58) Field of Search ................................ 348/594, 593, 348/595, 177, 178; H04N 9/74, 17/00, 17/02

(56) References Cited

U.S. PATENT DOCUMENTS

| | | | | |
|---|---|---|---|---|
| 4,121,253 A | | 10/1978 | McCoy | |
| 4,805,022 A | * | 2/1989 | Abt | 348/594 |
| 4,823,183 A | * | 4/1989 | Jackson et al. | 348/594 |
| 5,283,652 A | * | 2/1994 | Fairhurst | 348/594 |
| 5,349,388 A | * | 9/1994 | Turner et al. | 348/594 |
| 5,825,433 A | * | 10/1998 | Yamada et al. | 348/584 |
| 5,905,539 A | * | 5/1999 | Angell | 348/594 |

FOREIGN PATENT DOCUMENTS

| | | |
|---|---|---|
| GB | 2272127 | 5/1994 |
| WO | WO 86/05646 | 9/1986 |

* cited by examiner

*Primary Examiner*—John W. Miller
*Assistant Examiner*—Trang U. Tran
(74) *Attorney, Agent, or Firm*—Frommer Lawrence & Haug LLP; William S. Frommer; Darren M. Simon

(57) ABSTRACT

A wipe pattern comprises a series of horizontal rows, R0–R4. As the wipe proceeds first video Y in a row is replaced by second video X. The wipe proceeds from row to row. The wipe may progress from left to right from the top row to the bottom or from right to left from the bottom row to the top. An alternative wipe pattern comprises vertical rows. In another alternative, the wipe in one row begins before the wipe of the preceding row ends.

6 Claims, 8 Drawing Sheets

A

B

C

A

B

C

SIGNAL GENERATOR

BACKGROUND OF THE INVENTION

1. Field of the Invention

The present invention relates to a signal generator for use in a video wipe generator. Such a wipe effect generator is used in a vision mixer for wiping between two video sources

2. Description of the Prior Art

Reference will now be made to FIGS. 1 to 3 of the accompanying drawings which show the background to the present invention.

FIG. 1 illustrates a known simple wipe between two video sources X and Y. As the wipe proceeds as indicated by arrow W, video X is replaced across the display by video Y (or vice versa). The effect of the wipe is achieved by mixing the video sources X and Y according to KX+(1−K)Y, where K is a keying signal. The keying signal is derived from a 'solid'. This will be explained with reference to FIGS. 2 and 3.

A solid is an electrical signal representing a three dimensional surface of a desired shape. It may comprise at least one ramp signal and typically comprises a combination of at least two ramp signals which themselves may be modified. It may also comprise a signal defined by a polar coordinate system representing a curved surface.

FIGS. 2A illustrates a known example of a solid 125 which is a simple ramp. As shown in FIG. 2, a clip level 142 is defined. It will be appreciated that over a field or frame, the clip level 142 is defined. It will be appreciated that over a field or frame, the clip level 142 defines a plane referred to herein as the clip plane 142. The keying signal K is in known manner, derived from the solid by applying high gain to the solid and limiting the result, as shown in FIG. 2B. The keying signal has two levels 0 and 1. The transition between the levels occurs where the solid intersects the clip plane 142. The position of the intersection is varied, to produce the wipe, by adding an offset to the solid.

FIG. 3 is a schematic block diagram of a wipe generator of a vision mixer comprising a solid generator, a clip element, a gain element, a limiter and a mixer which mixes video sources X and Y in dependence upon the keying signal K. The solid generator produces a solid, for example a ramp as shown in FIG. 2A. The clip element applies an offset to the ramp to vary the intersection of the ramp with the clip plane 142 as shown in FIGS. 2A to 2C. Gain is applied to the offset ramps, in the gain element and the result limited in the limited to produce the signal K. The amount of gain applied may be varied as shown in FIG. 2B: that varies the slope of the transition between the limit values of the keying signal K.

The mixer mixes the video sources X and Y according KX+(1−K)Y. Thus if K=1 the output is X, if K=0 the output is Y. If the gain applied to the solid is unity and the clip offset is zero, the solid and the key signal are identical.

The example of FIGS. 1 and 2 for ease of explanation refer to a solid, a ramp, which varies as a function of only pixel position h along a line to produce a simple wipe effect. It will be appreciated that it is possible to produce solids which vary as a function of both h and v co-ordinates in a picture, where v is a line number to produce more complex wipe effects.

The present invention is concerned with the generation of a solid which allows the production of new wipe effects.

SUMMARY OF THE INVENTION

According to the present invention, there is provided a solid generator for use in a vision mixer comprising, means for producing ramp signals within each video field or frame, each ramp signal having an amplitude which increases in a predetermined direction, means for producing an offset signal, the offset signal having a value mV where m=1 to M where M≧2 mV being fixed for each set m of n ramp signal where n>2 and means for adding the ramp signal to the offset signal to produce the solid.

Such a signal generator produces a solid which allows the production of a wipe effect which is believed to be novel per se. The wipe effect comprises bands which progress across a frame as the wipe proceeds. Consecutive bands have start times which differ by controllable amount. The bands may be contiguous or spaced apart. The bands may be confined to an area of a frame, or may occupy the whole frame. The wipe may proceed in the line direction or the frame direction.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

The following description assumes a frame is progressively scanned.

Referring to FIG. 4A, an illustrative wipe pattern in accordance with the present invention comprises a horizontal band 1 of a video from a source Y which progressively moves across a frame video of source X in the direction of arrow W. Further bands 2 to 4 and 5 follow band 1 with a delay.

The delay between the bands may be selected. For example band 2 may start only when band 1 has progressed to very near the right hand edge of the frame. The widths of the bands is selectable. The direction of the wipe may be reversed.

As shown in FIG. 4B the bands 1 to 4 may be vertically spaced.

The wipe pattern is shown in FIGS. 4A and B as occupying the whole of a frame. The pattern may be restricted to a restricted area of the frame as shown in FIG. 4C.

Figure 1:
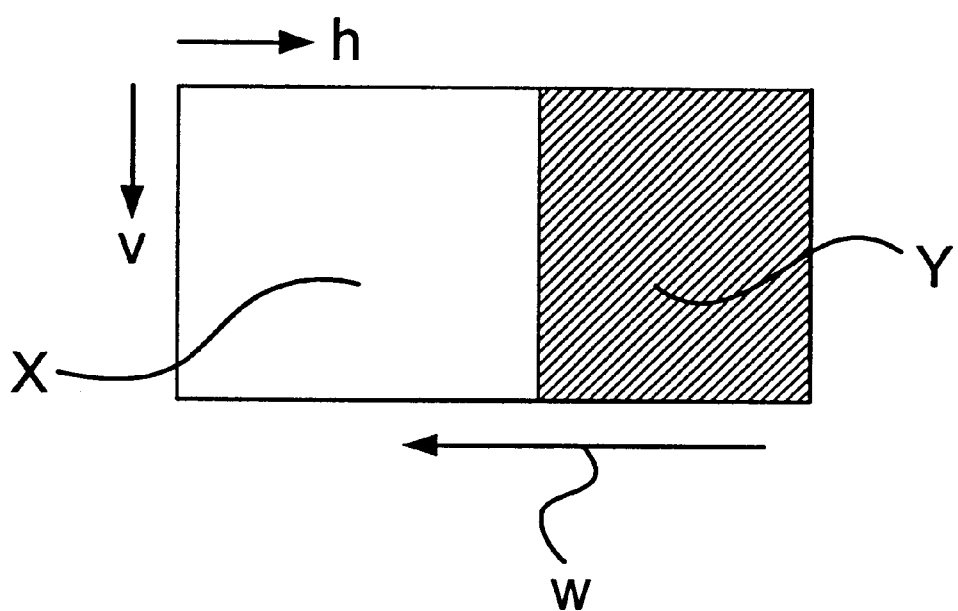
FIG. 1 illustrates a wipe.
Figure 2:
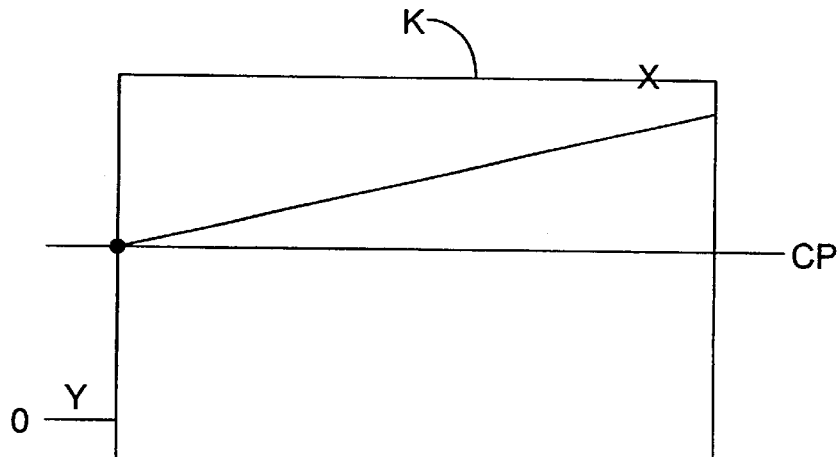
FIG. 2 illustrates a solid together with a key signal.
Figure 2:
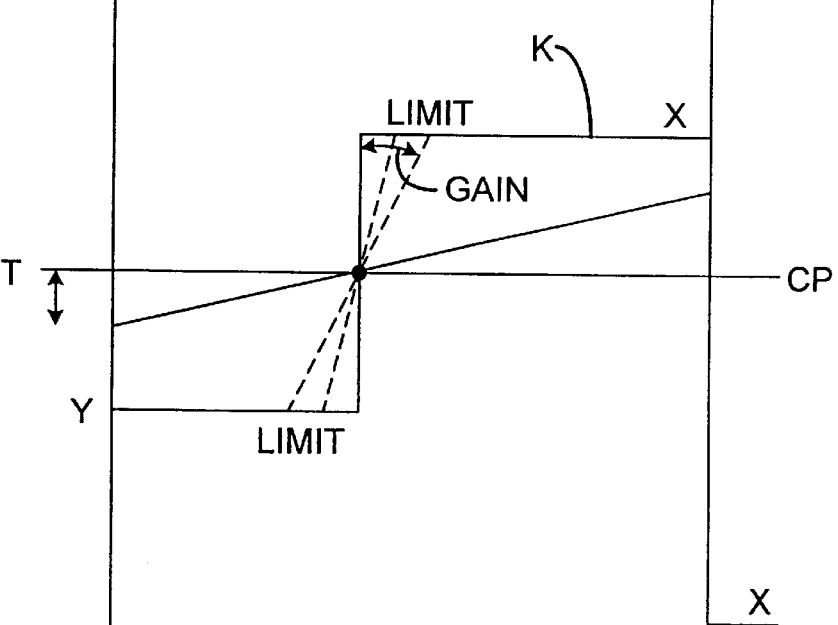
Figure 2:
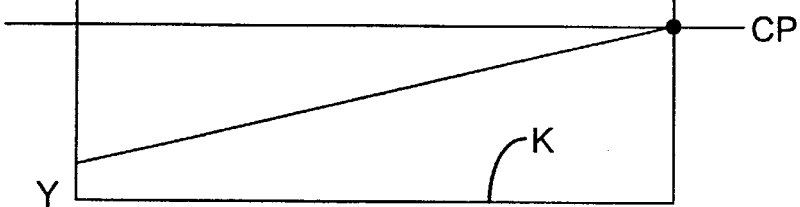
Figure 3:
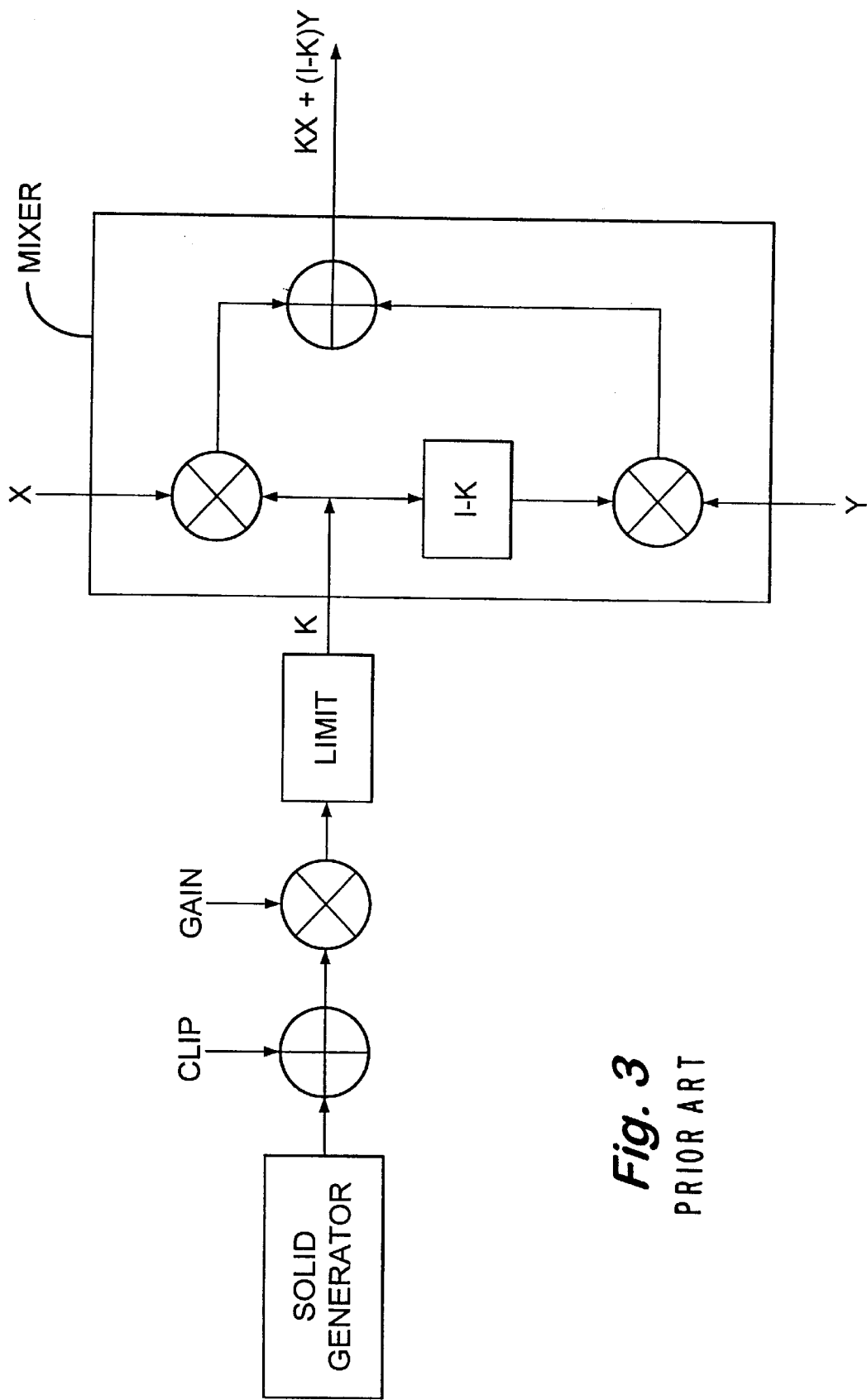
FIG. 3 is a schematic block diagram of a wipe generator.
Figure 4:
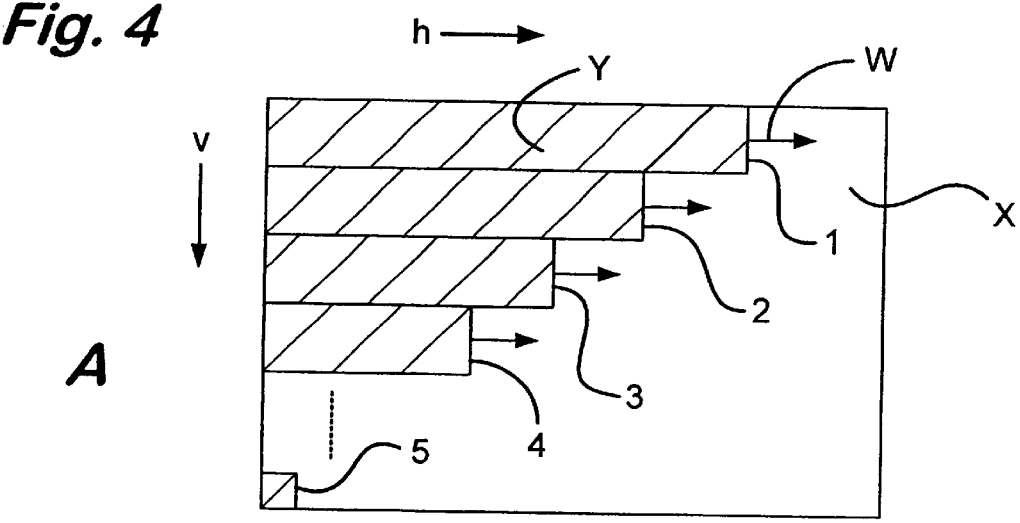
FIGS. 4A and B illustrate two wipe patterns in accordance with the present invention.
FIG. 4C shows another wipe pattern in accordance with the invention.
Figure 4:
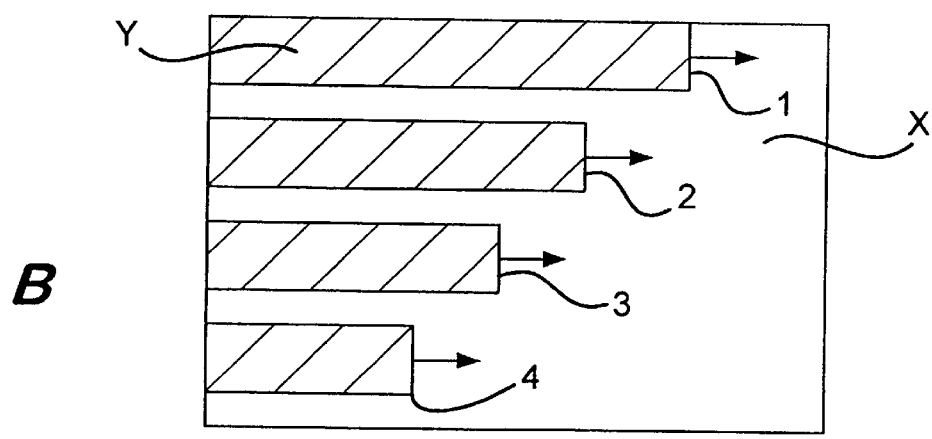
Figure 4:
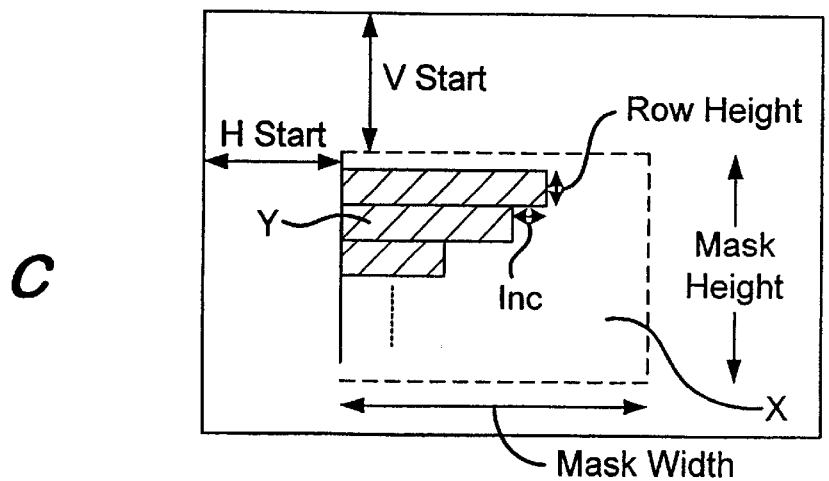

The inventors have termed wipe patterns, such as those shown in FIG. 4, "karaoke wipes" because they resemble displays produced by karaoke machines.

Figure 5:
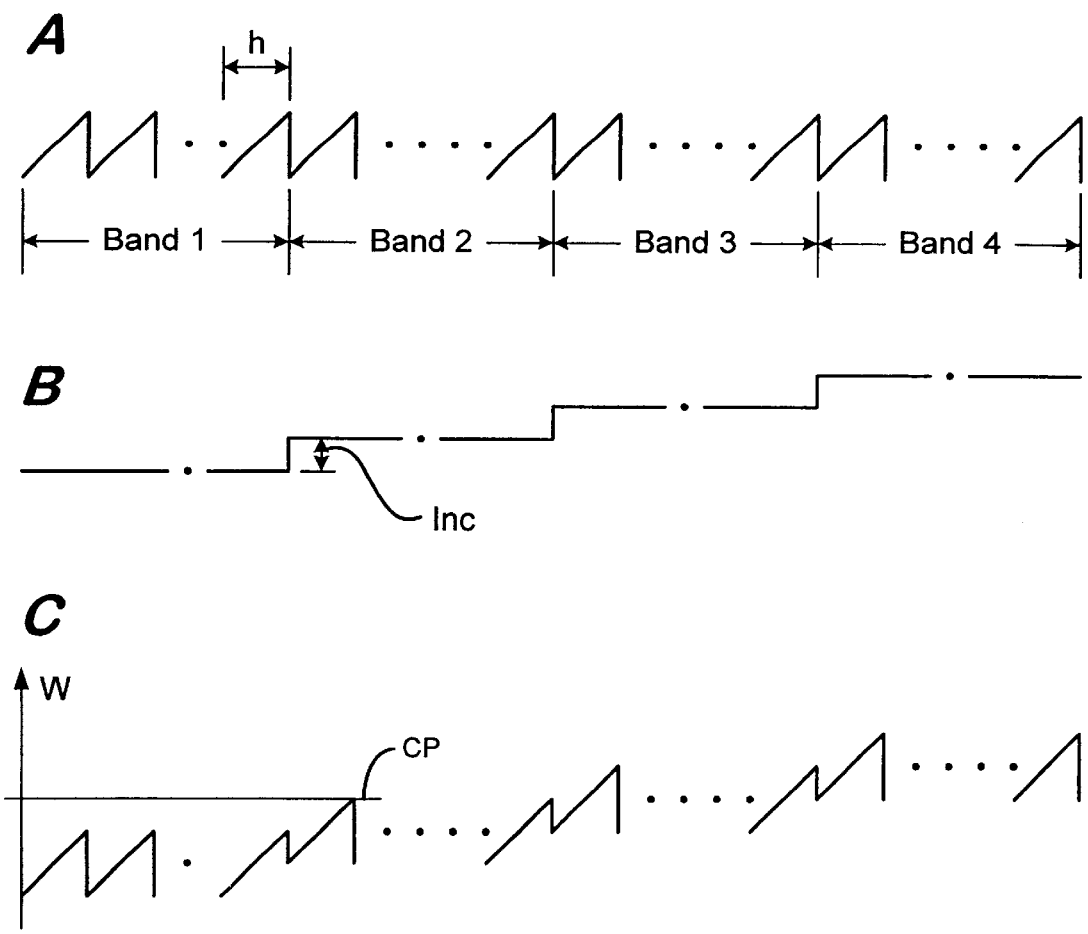
FIGS. 5A to C are waveform diagrams illustrating the "solid" which allows the production of the wipe pattern of FIG. 4A.

FIGS. 5A to C show waveforms used to generate the wipe pattern of FIG. 4A. FIG. 5A shows repeated horizontal ramp waveforms each having a duration of one horizontal line interval 1H. The number of lines is equal to the number of active lines of a frame.

The lines are grouped into bands, 1 to 5 in FIG. 5A. Any suitable number n of bands may be chosen. The number of lines per band is L/n.

FIG. 5B shows a stepped waveform. The waveform is shown in FIG. 5B as stepping up from left to right. In terms of the video frame the waveform steps up from top to bottom of the frame. Each step has a duration of L/n lines coincident with the bands 1 to 5. The waveform of FIG. 5A is added to the waveform of FIG. 5B to produce the waveform of FIG. 5C which represents the 'solid' defining the wipe pattern of FIG. 4A.

The clip plane CP is shown at CP in FIG. 5C. By varying the offset between the solid and the clip plane in the direction of arrow W in FIG. 5C, the wipe proceeds in the direction W shown in FIG. 5C.

Figure 6:
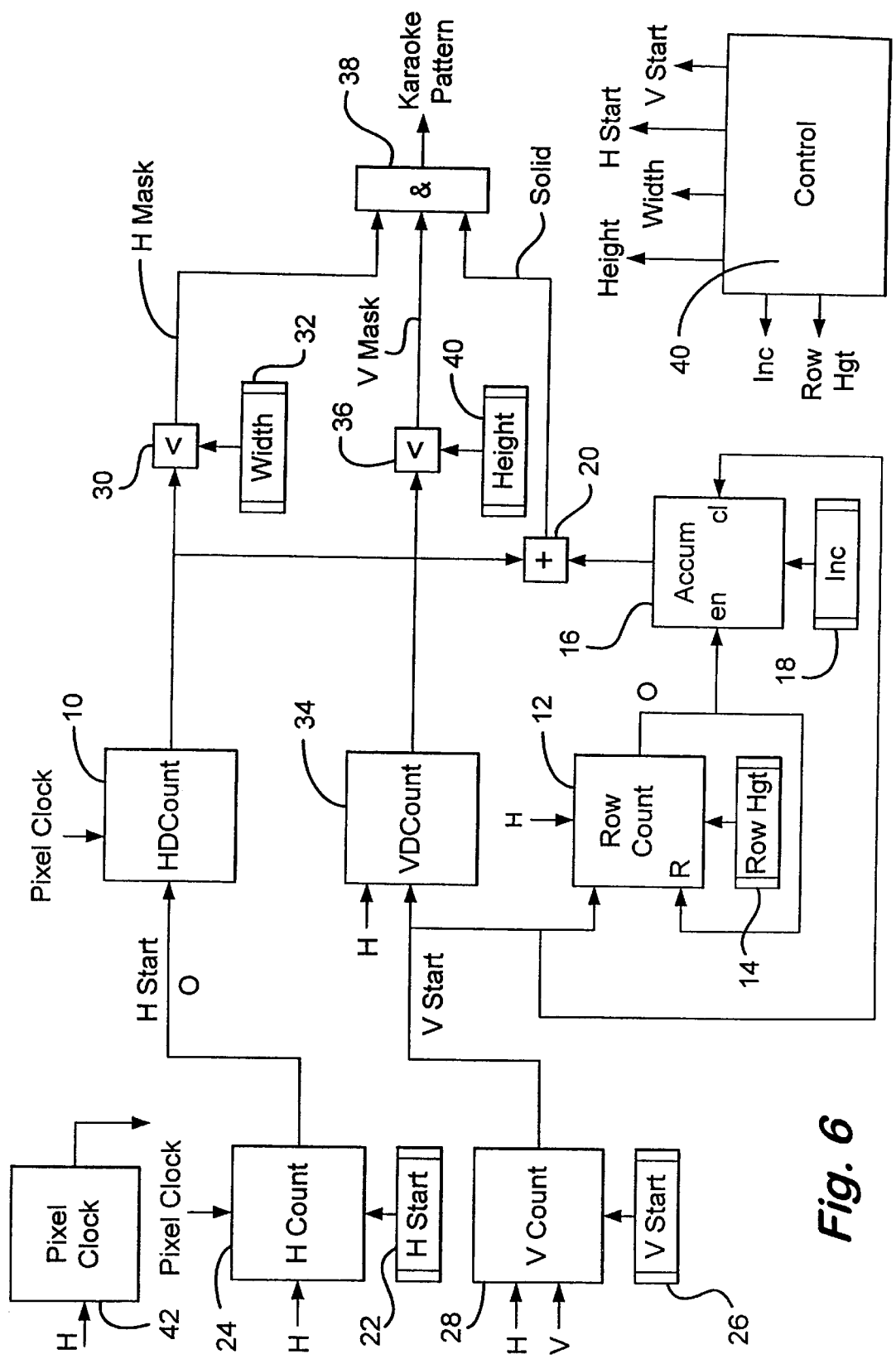
FIG. 6 is a schematic block diagram of an embodiment of a signal generator according to the present invention.

FIG. 6 is a schematic block diagram of an illustrative digital signal generator for producing the waveforms of FIGS. 5A to C and thus the wipe patterns of FIGS. 4A to C. Pixels along lines H are essentially defined by clocks of a pixel clock 42 synchronised to the lines H.

Referring initially to FIGS. 4A, 5C and 6, a horizontal counter 10 counts pixels in the horizontal direction along a video line from reception of a signal Hstart. Assume H start is at the beginning of each line. The count of the counter 10 then represents the ramp shown in FIG. 5A. The counter is reset by Hstart at the beginning of each line and thus produces the repeated ramps of FIG. 5A.

A row counter 12 is preloaded with a value RowHgt stored in a register 14 and representing the number of lines L/n in a band. The counter 12 counts down in response to each line H. When the count reaches 0 indicating the end of a band an accumulator 16 is enabled and the value in the accumulator incremented by an increment Inc stored in a register 18. The increment Inc represents the delay in pixels between successive bands and is indicated by Inc in FIGS. 4C and 5B. The maximum value is one line interval IH and the minimum value is zero.

The count of 0 in row counter 12 also reloads RowHgt into the counter 12 and the counting down repeats for the next band.

The output of the accumulator (FIG. 5B) is added to the output of the horizontal counter 10 (FIG. 5A) in an adder 20 to produce the solid of FIG. 5C.

At the beginning of the next frame, in the case of FIG. 4A, the accumulator 16 is cleared to zero by a signal Vstart. The accumulation process then repeats on the next frame.

Referring to FIG. 4C, the wipe pattern, i.e. the solid, may be restricted to an area A. The start position of the area A is defined by the signals Hstart and Vstart.

A value Hstart is stored in a register 22. The value Hstart represents the number of pixels from the left hand edge of the frame in the line direction of the top left corner of the area A. The value Hstart is loaded into a counter 24 at the beginning of each line. The counter 24 counts down and at zero count enables the counter 10 to count pixels.

A value Vstart is stored in a register 26. Value Vstart represents the number of lines from the top of the frame to the top of the area A. Vstart is loaded into a counter 28 at the beginning of each frame. The counter 28 counts down in response to lines H and at count zero the counter 10 is enabled to count pixels.

A horizontal comparator 30 compares the count of the horizontal counter 10 with a value Width stored in a register 32. The value Width represents the horizontal width in pixels of the area A. When the count is less than Width the comparator 30 outputs logic '1'.

A vertical counter 34 enabled by Vstart counts lines H, of the area A. A comparator 36 compares a value Height, stored in a register 40, representing the height in lines of the area A, with the count of counter 36. When the count is less than Height, the comparator 36 outputs logic '1'.

An AND gate 38 is enabled by the logic '1's from both of the comparators 30 and 36 to pass the solid which is output from adder 20.

The values Hstart, Vstart, Width, Height, RowHgt, and Inc stored in the registers 22, 26, 32, 40, 14 and 18 may be varied, using a control processor 40.

Figure 7:
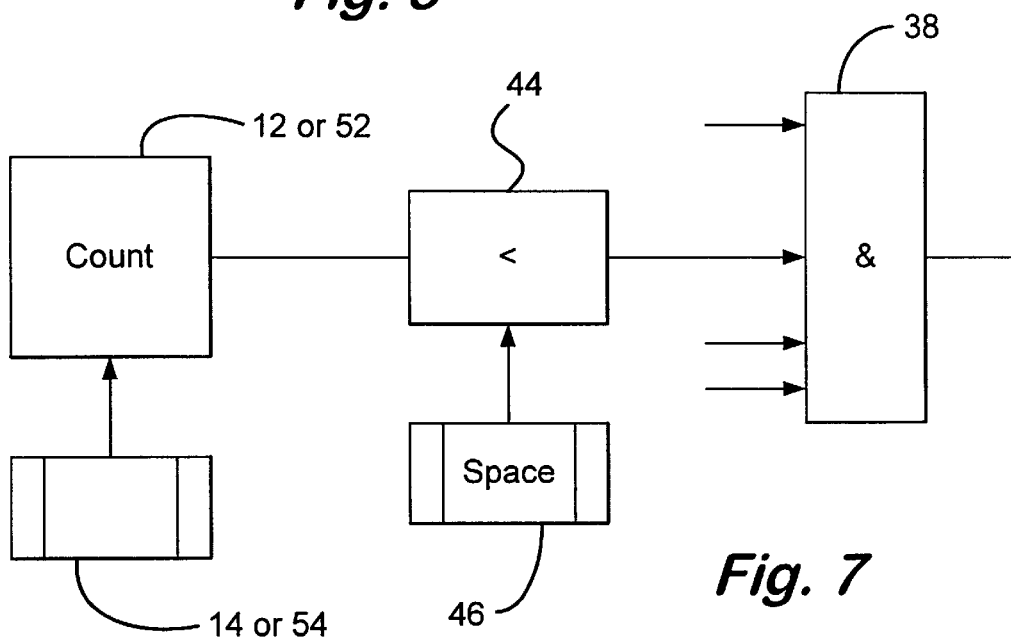
FIG. 7 illustrates a modification of the signal generator of FIG. 6 or 9.

FIG. 4B shows a wipe pattern in which bands 1 to 4 are spaced apart. One way of achieving that is to apply a logic '0' to the AND gate 38 for the lines corresponding to the spaces. FIG. 7 shows one example of a modification of FIG. 6 for achieving that. A comparator 44 compares a value Space stored in a register 46 with the value of the count in the Row Counter 12. If the value of the count is less then or equal to Space, the comparator outputs logic 0 to the AND gate 38.

FIG. 8A illustrates one example of a Karaoke wipe pattern which wipes vertically.

FIGS. 8B and C illustrate waveforms involved in producing the wipe pattern of FIG. 8A.

As shown in FIG. 8C, a ramp waveform is produced in the vertical direction. The ramp has the form R=Bv, where v is line number, and B is the slope of the ramp.

The columns C1–C3 . . . Cn of the wipe are defined by a stepped waveform as shown in FIG. 8B. The waveform occurs on each line and each step has a width of h pixels. The delay between adjacent columns C is defined by the increment Inc between the steps.

Figure 8:
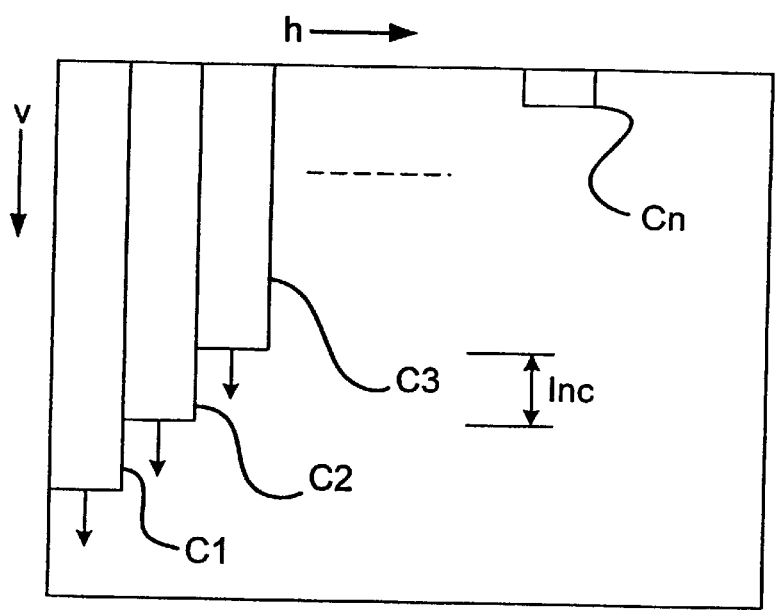
FIGS. 8A to C illustrate another wipe pattern in accordance with the present invention and wave forms allowing the production of the pattern.
Figure 8:
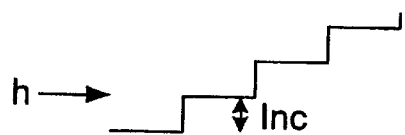
Figure 8:
Figure 9:
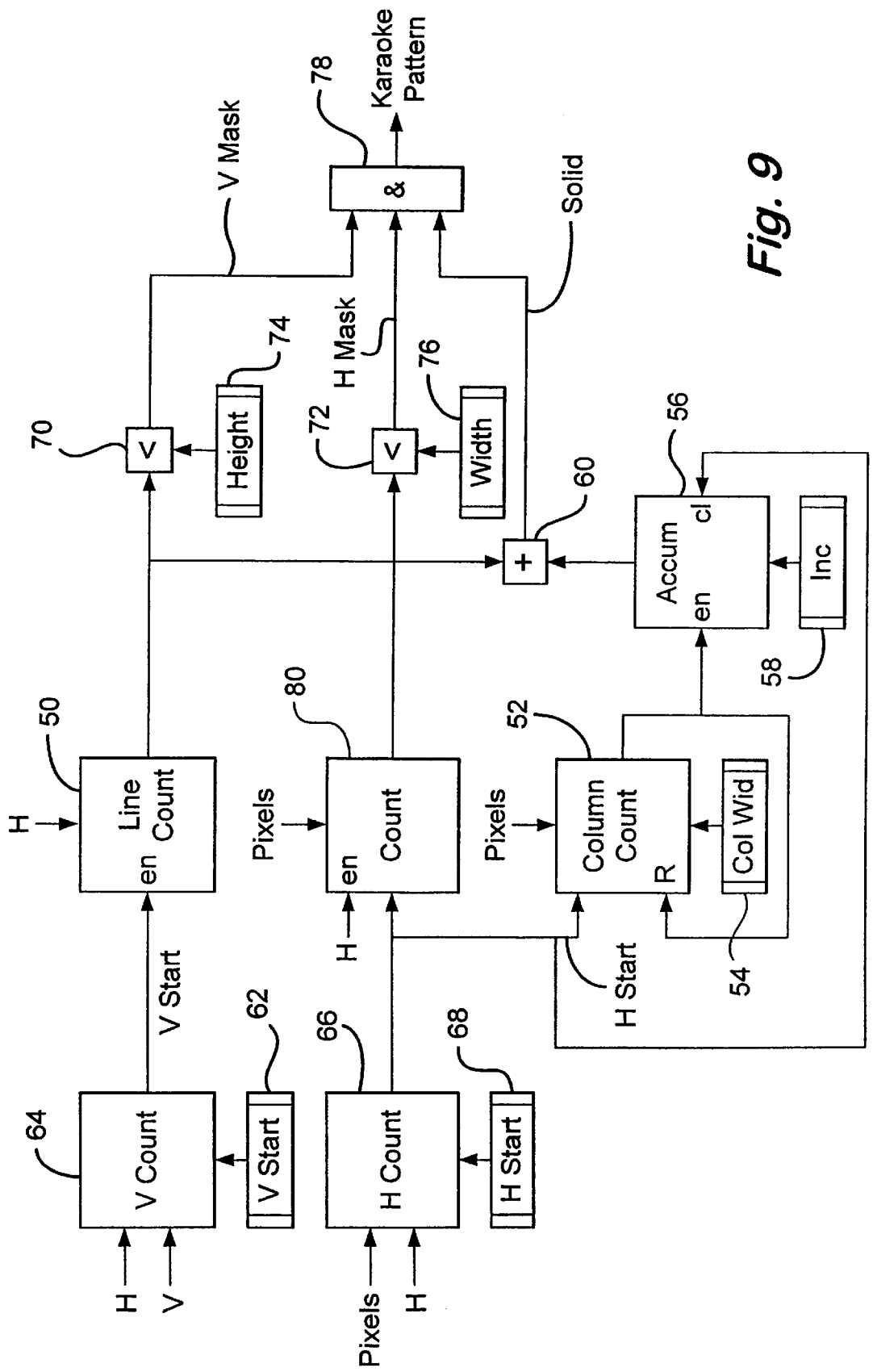
FIG. 9 is a schematic block diagram of an embodiment of another signal generator according to the invention.

FIG. 9 shows an illustrative signal generator for producing the vertical wipe pattern of FIG. 8A. It operates in very similar fashion to the generator of FIG. 6.

Once enabled by a signal Vstart, a line counter 50 counts lines H to produce the ramp waveform R=Bv of FIG. 8.

A column counter 52 is loaded with a count ColWid, stored in a register 54 and counts down in response to pixels along each line. When the count reaches 0, an accumulator 56 is enabled and the value in the accumulator incremented by the increment Inc, which is stored in a register 58. The counter 52 is also reloaded with ColWid. The accumulator 56 and the counter 52 are reset by a signal Hstart.

The outputs of the line counter 50 and the accumulator 56 are added in an adder 60. The output of the adder 60 is solid which allows the production of the wipe pattern of FIG. 8A.

The foregoing assumes that the wipe pattern occupies an entire frame. The wipe pattern may be restricted to an area A similar to that shown in FIG. 4C. The vertical position of the are A is defined by the value Vstart in a register 62. A counter 64 is preloaded with Vstart and counts down in response to lines H beginning at the start V of the frame. When the count is zero counter 50 is enabled.

Similarly counter 52 is enabled by an H counter 66 which counts down in response to pixels from the beginning of each line. The counter is preloaded with value Hstart stored in a register 68.

The height and width of area A are controlled by comparators 70, 72. Comparator 70 compares a value Height stored in a register 74 with the count in the counter 50. Comparator 72 compares a value Width stored in a register 76 with the count of a counter 80 which counts pixels when enabled by Hstart. The comparator operate, and disable AND gate 78, in the manner described with reference to FIG. 6.

The values stored in the registers 54, 58, 62, 68, 74, 76 may be selected as discussed with reference to FIG. 6. The columns may be spaced in the same way as shown in FIG. 7, with the row counter 12 and Row Hgt register 14 of FIG. 7 replaced by the Column counter 52 and Col Wid register 54 of FIG. 9.

Although the invention has been described wit reference to a progressively scanned frame, it may be applied to interlaced fields.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A signal generator for generating a solid signal for use by a video wipe generator in producing a horizontal banded wipe pattern on an external display when transitioning between a first video frame and a second video frame, comprising:
    a pixel clock for producing a clock signal synchronized with the input of said second video frame;
    a horizontal counter for incrementing a pixel count on the basis of said clock signal; the pixel count corresponding to the pixels in a horizontal video line of said second video frame; the horizontal counter initializing said pixel count to a horizontal start pixel for each horizontal video line of said second video frame;
    a row counter for decrementing a row count synchronized with the input of each horizontal video line of said second video frame; the row counter initializing the row count to a row height value corresponding to the number of horizontal video lines in a band of said horizontal banded wipe pattern; said row counter enabling an accumulator and resetting the row count to said row height value when said row count is decremented to zero;
    said accumulator incrementing an accumulated value by an increment value when enabled by said row counter; said increment value corresponding to a pixel delay between bands of said horizontal banded wipe pattern; and
    an adder connected to said horizontal counter and said accumulator for adding said pixel count to said accumulated value to produce said solid signal.

2. The signal generator according to claim 1, further comprising:
    a horizontal comparator connected to said horizontal counter for outputting a logical 1 when said pixel count is less than a width value; said width value corresponding to the width of the horizontal banded wipe pattern within said second video frame;
    a vertical counter for incrementing a line count synchronized with the input of said second video frame; said line count corresponding to the horizontal video lines of said second video frame; the vertical counter initializing the line count to a vertical start line for said second video frame;
    a vertical comparator connected to said vertical counter for outputting a logical 1 when said line count is less than a height value; said height value corresponding to the height of the horizontal banded wipe pattern within said second video frame; and
    an AND gate connected to said horizontal comparator, said vertical comparator, and said adder for enabling the output of said solid signal when both the horizontal comparator and the vertical comparator output logical 1s; thereby restricting the horizontal banded wipe pattern to an area within said second video frame as defined by said horizontal start pixel, said vertical start line, said width value, and said height value.

3. The signal generator according to claim 2, further comprising:
    a space comparator connected to said row counter for outputting a logical 1 when said row count is greater than a space value; said space value corresponding to the number of horizontal video lines between bands of said horizontal banded wipe pattern; and
    said AND gate being connected to said space comparator for enabling the output of said solid signal when the horizontal comparator, the vertical comparator, and the space comparator output logical 1s, thereby spacing the bands of the horizontal banded wipe pattern by said space value.

4. A signal generator for generating a solid signal for use by a video wipe generator in producing a vertical banded wipe pattern on an external display when transitioning between a first video frame and a second video frame, comprising:
    a line counter for incrementing a line count synchronized with the input of said second video frame; said line count corresponding to the horizontal video lines of said second video frame; the line counter initializing the line count to a vertical start line for said second video frame,
    a column counter for decrementing a column count synchronized with the input of said second video frame; the column counter initializing the column count to a column width value corresponding to the number of columns in a band of said vertical banded wipe pattern; said column counter enabling an accumulator and resetting the column count to said column width value when said column count is decremented to zero;
    said accumulator incrementing an accumulated value by an increment value when enabled by said column counter; said increment value corresponding to a column delay between bands of said vertical banded wipe pattern; and
    an adder connected to said line counter and said accumulator for adding said line count to said accumulated value to produce said solid signal.

5. The signal generator according to claim 4, further comprising:
    a vertical comparator connected to said line counter for outputting a logical 1 when said line count is less than a height value; said height value corresponding to the height of the vertical banded wipe pattern within said second video frame;
    a horizontal counter for incrementing a pixel count synchronized with the input of said second video frame;

the pixel count corresponding to the pixels in a horizontal video line of said second video frame; the horizontal counter initializing said pixel count to a horizontal start pixel for each horizontal video line of said second video frame;

a horizontal comparator connected to said horizontal counter for outputting a logical 1 when said pixel count is less than a width value; said width value corresponding to the width of the vertical banded wipe pattern within said second video frame; and an AND gate connected to said horizontal comparator, said vertical comparator, and said adder for enabling the output of said solid signal when both the horizontal comparator and the vertical comparator output logical 1s; thereby restricting the vertical banded wipe pattern to an area within said second video frame as defined by said horizontal start pixel, said vertical start line, said width value, and said height value.

6. The signal generator according to claim 5, further comprising:

a space comparator connected to said column counter for outputting a logical 1 when said column count is greater than a space value; said space value corresponding to the number of pixels between bands of said vertical banded wipe pattern; and said AND gate being connected to said space comparator for enabling the output of said solid signal when the horizontal comparator, the vertical comparator, and the space comparator output logical 1s, thereby spacing the bands of the vertical banded wipe pattern by said space value.

* * * * *